United States Patent [19]
Stahl et al.

[11] Patent Number: 5,873,553
[45] Date of Patent: Feb. 23, 1999

[54] MOUNTING BRACKET ASSEMBLY FOR AN OUTLET BOX

[75] Inventors: Shawn Stahl, Allegan; Greg Slocum, Grand Haven; Steve Teays, Springlake; Richard Van Vugt, Jenison; Richard Weise, Coopersville, all of Mich.

[73] Assignee: Herman Miller Inc., Zeeland, Mich.

[21] Appl. No.: 892,016

[22] Filed: Jul. 14, 1997

[51] Int. Cl.[6] .................................................. A47B 96/06
[52] U.S. Cl. .................... 248/205.1; 220/3.6; 220/3.9; 248/906
[58] Field of Search ............................. 248/27.1, 205.1, 248/906, 231.9; 220/3.6, 3.9; 174/58

[56] References Cited

U.S. PATENT DOCUMENTS

| | | |
|---|---|---|
| 1,113,092 | 10/1914 | Beugler . |
| 1,393,794 | 10/1921 | Kuhlman . |
| 1,509,288 | 9/1924 | Fralick . |
| 1,620,063 | 3/1927 | Bowers . |
| 1,722,430 | 7/1929 | Kelly . |
| 1,790,031 | 1/1931 | Vaughn . |
| 1,828,064 | 10/1931 | Paine . |
| 2,126,114 | 8/1938 | Jeff . |
| 2,130,839 | 9/1938 | Conners ................................. 247/19 |
| 2,180,598 | 11/1939 | Mahan . |
| 2,233,731 | 3/1941 | Budnick ................................. 220/3.6 |
| 2,439,091 | 4/1948 | Keating ................................. 248/27.1 |
| 2,448,359 | 8/1948 | Davison ................................. 248/27 |
| 2,586,728 | 2/1952 | Shepard ................................. 248/27 |
| 2,771,501 | 11/1956 | Despard ................................. 174/53 |
| 2,879,912 | 3/1959 | Appleton ................................. 220/3.9 |
| 2,992,754 | 7/1961 | Grimes ................................. 220/18 |
| 3,146,298 | 8/1964 | Ceglia ................................. 174/49 |
| 3,184,191 | 5/1965 | Esoldi ................................. 248/27 |
| 3,315,924 | 4/1967 | Greenwood ................................. 248/27 |
| 3,424,332 | 1/1969 | Pimentel ................................. 220/3.6 |
| 3,588,019 | 6/1971 | Cozeck ................................. 248/228.6 |
| 3,596,860 | 8/1971 | MacKay ................................. 248/216.1 |
| 3,620,401 | 11/1971 | Lund ................................. 220/3.6 |
| 3,780,209 | 12/1973 | Schuplin ................................. 174/51 |
| 4,098,423 | 7/1978 | Marrero ................................. 248/906 X |
| 4,108,414 | 8/1978 | Grant, Sr. ................................. 248/300 |
| 4,135,337 | 1/1979 | Medlin ................................. 52/221 |
| 4,180,226 | 12/1979 | Matte ................................. 248/27.1 |
| 4,226,393 | 10/1980 | Rardin ................................. 248/205.1 |
| 4,232,183 | 11/1980 | Person ................................. 174/48 |
| 4,296,870 | 10/1981 | Balkwill ................................. 220/3.3 |
| 4,447,030 | 5/1984 | Nattel ................................. 248/27.1 |
| 4,533,060 | 8/1985 | Medlin ................................. 220/3.9 |
| 4,561,615 | 12/1985 | Medlin, Jr. ................................. 248/27.1 |
| 4,693,438 | 9/1987 | Angell ................................. 248/27.3 |
| 4,847,444 | 7/1989 | Holland ................................. 174/58 |
| 5,172,530 | 12/1992 | Fishel ................................. 52/221 |
| 5,239,132 | 8/1993 | Bartow ................................. 174/58 |
| 5,263,676 | 11/1993 | Medlin, Jr. ................................. 248/300 |
| 5,449,859 | 9/1995 | Bordwell ................................. 174/48 |
| 5,598,998 | 2/1997 | Lynn ................................. 248/300 |
| 5,646,371 | 7/1997 | Fabian ................................. 174/58 |

Primary Examiner—Ramon O. Ramirez
Attorney, Agent, or Firm—Brinks Hofer Gilson & Lione

[57] ABSTRACT

A mounting bracket assembly including a mounting bracket and an outlet box having a mounting member. The mounting bracket includes a plate member having an opening adapted to receive the outlet box and a support member extending laterally from the plate member at an edge of the opening. A tab member is affixed to one of the mounting member and the support member and engages the other thereof. One of the mounting member and support member also includes a raised portion which slidably engages the other member during insertion of the outlet box so as to bias the mounting member away from the support member until the raised portion is brought into locking engagement with the other member. A method for installing an outlet box includes providing a wall panel with a mounting bracket installed internally therein, cutting an opening in a wall member of the panel in alignment with the opening in the plate member, and inserting an outlet box having a mounting member such that the tab member engages one of the support member and mounting member and the raised portion slidably engages one of the support member and mounting member during insertion so as to bias the members away from each other until the raised portion is brought into locking engagement with the other of the members.

30 Claims, 9 Drawing Sheets

MOUNTING BRACKET ASSEMBLY FOR AN OUTLET BOX

BACKGROUND OF THE INVENTION

The present invention relates generally to a bracket assembly, and in particular, to an improved mounting bracket assembly for installing an outlet box, such as an electrical outlet box, in a wall or panel.

In modern society, walls typically are provided with electrical outlets, data and communication lines and other utility devices such as electrical switches. Similarly, moveable panel systems, which are commonly used to divide large, open office space into separate work spaces, also typically provide access to electricity through outlets, and to data and communication lines which can be routed internally therein. For example, Herman Miller, Inc., the assignee of the present application, manufacturers and sells three such work space management systems: the ACTION OFFICES® system, the ETHOSPACE® system and the Q SYSTEM™ system.

Typically, electrical outlets, data and communication lines, switches and the like are mounted in an outlet box, sometimes referred to as an electrical box or a junction box. The outlet box, in turn, is often supported by a mounting bracket, which is positioned internally in the wall or panel and is secured therein to an internal frame member, stud or like support. Typically, the outlet box is mounted to the bracket with mechanical screw-type fasteners, which can be difficult to access. The mounting bracket provides support for the outlet box and allows the box to be spaced apart from the frame member. Alternatively, the box can be supported by brackets engaging only the outermost wallboard, or other surface sheet material, or can be mounted directly to the frame member. Typically, an opening is provided in the wallboard, or other material, so as to expose the outlet box to the user.

In panel systems, the frame members typically extend along the ends of the panel and are used to connect adjacent panels as well as support various shelving configurations, overheads and the like. Therefore, outlet boxes mounted directly to the frame members can interfere with the installation of the various accessories or can be difficult to access when two panels are attached to one another in a perpendicular arrangement.

When using a mounting bracket to support an outlet box within a wall or panel, the box typically is fastened to the bracket prior to the installation of the wallboard or other sheet material. Often, however, it is desirable to make panels retrofittable, wherein the panel may not initially be provided with electrical power, data or communication lines at the user's request, but wherein it is later desired to install outlets and the like. Typically, in such a situation, the outlet box can only be secured directly to a frame member, or to the wall board itself through use of brackets and the like, since it is generally not possible to mount a bracket inside the panel due to its enclosed configuration. Moreover, the installation of many outlet boxes requires access to fasteners located outside the outlet box, but inside the panel, so as to make retrofit installation nearly impossible.

In addition, outlet boxes typically are secured to the frame or brackets with various mechanical fasteners, which can be difficult to access and/or install. Fasteners such as screws, bendable tabs and the like can be difficult to orient or to initiate the threading thereof, require extensive human manipulation and can be time consuming to install, both in the manufacturing facility and in the field.

SUMMARY OF THE INVENTION

Briefly stated, the invention is directed to an improved mounting assembly including a mounting bracket and an outlet box having a mounting member. The mounting bracket includes a flat plate member having an opening adapted to receive the outlet box and a support member extending laterally from the plate member at an edge of the opening. A tab member is affixed to either the mounting member or the support member and engages the other thereof. Likewise, a raised portion is disposed on either the mounting member or the support member and is brought into locking engagement with the other thereof by sliding the raised portion along the surface of the other member so as to bias the mounting member away from the support member until the raised portion snaps into engagement with the other member.

In one embodiment, the support member includes an insert opening and a cutout which forms an edge in the support member. The raised portion is disposed on the mounting member and includes a lip portion and a ramped surface. The tab member is affixed to the mounting member. The mounting member is connected to the mounting bracket by engaging the support member at a edge of the insert opening with the tab member, and by engaging the edge of the cutout with the lip portion.

In an alternative embodiment, the raised portion is configured as a protuberance, or nipple, disposed on the support member. The protuberance is received in an opening positioned in the tab member.

In an alternative embodiment, either or both of the tab member and raised portions, including either the lip portion or protuberance, can extend from the mounting bracket and engage an insert opening and cutout in the mounting member.

In yet another alternative embodiment, the support member includes a hanger member which forms an insert opening. In one embodiment, the hanger member includes a protuberance which is received within the opening of the tab member. Alternatively, the hanger member depends from the mounting member and engages a tab member extending from the support member.

In another embodiment, the mounting member, including the tab members and lip portion, are integrally formed as part of the outlet box. Alternatively, the mounting member is formed as a separate plate member which is attached to the outlet box.

In another aspect of the invention, a method is provided for field installing an outlet box in a panel having a mounting bracket mounted therein as described above. In particular, an installer cuts an opening in the wallboard, or other outer sheet material, such that the opening is in alignment with the opening in the plate member of the mounting bracket. An outlet box, including a mounting member, is then inserted through the opening in the wallboard and into engagement with the mounting bracket wherein the tab member engages one of the support member and mounting member and wherein the raised portion engages one of the mounting member and support member so as to securely mount the outlet box in the wall or panel.

The present invention provides significant advantages over other bracket assemblies for mounting outlet boxes in walls or wall panels. In particular, the connection between the tab members and either the support member or the mounting member, and between the raised portion and either the support member or the mounting member, including, for example, an engagement with the protuberance, an engagement between the lip portion and the edge of the cutout, or both, allow the mounting member to be quickly and easily secured to the mounting bracket without the use of difficult to access mechanical fasteners, and without the use of tools. This snap-fit configuration also prevents the outlet box from being pushed and/or pulled through the wall or panel, and from being disengaged from the mounting bracket. Moreover, the installation can be completed completely external to the wall or panel simply by inserting the mounting members into engagement with the mounting bracket until the protuberance is received within the tab member opening, until the lip portion passes over the edge of the cutout, or both, to thereby engage the support member.

Moreover, a wall or panel can be outfitted with a relatively inexpensive mounting bracket during its initial assemblage but without a more expensive outlet box or wiring, where, for example, power is not desired by the user. In this way, the mounting bracket is covered by the wallboard or other sheet material so as to provide a solid exterior surface. Later, if it is desired to provide electrical power, or communication or data lines, an installer can easily mount an outlet box to the mounting bracket without having to access the inside of the panel and without having to remove or install various mechanical fasteners, such as screws and the like.

Moreover, because the outlet box can be installed using a snap-fit engagement without accessing the inside of the outlet box or panel, the outlet box can be prewired with a conduit and outlets or the like as an assembly, and then inserted into locking engagement with the mounting bracket. The prewired outlet box assembly avoids the need, whether it is in the manufacturing facility or in the field, to have an electrician install and electrically connect the wires in the conduit to the electrical outlet or the like, or mount the outlet in the outlet box. Thus, the unique design of the outlet box further simplifies the process for installing power in panels and the like.

In addition, by mounting the outlet box to the mounting bracket, as opposed to the wallboard, a stronger and more stable support is provided. The bracket also allows the installer to support the outlet box at a distance spaced apart from the frame member, which is typically located at an end of the panel. This is important with panel systems, where the panels may be oriented at right angles thereby making access to outlets positioned at the inside corner difficult. Similarly, overheads, shelving and other like accessories may be connected to the frame member, thereby making access to outlets mounted to the frame member difficult.

Therefore, the present invention provides a simple device and method for installing an outlet box in a wall or panel, and also allows an installer to easily retrofit a panel with power. Moreover, the invention allows a user to firmly support the outlet box at a distance from the frame member.

The present invention, together with further objects and advantages, will be best understood by reference to the following detailed description taken in conjunction with the accompanying drawings.

DETAILED DESCRIPTION OF THE PREFERRED EMBODIMENTS

Figure 1:
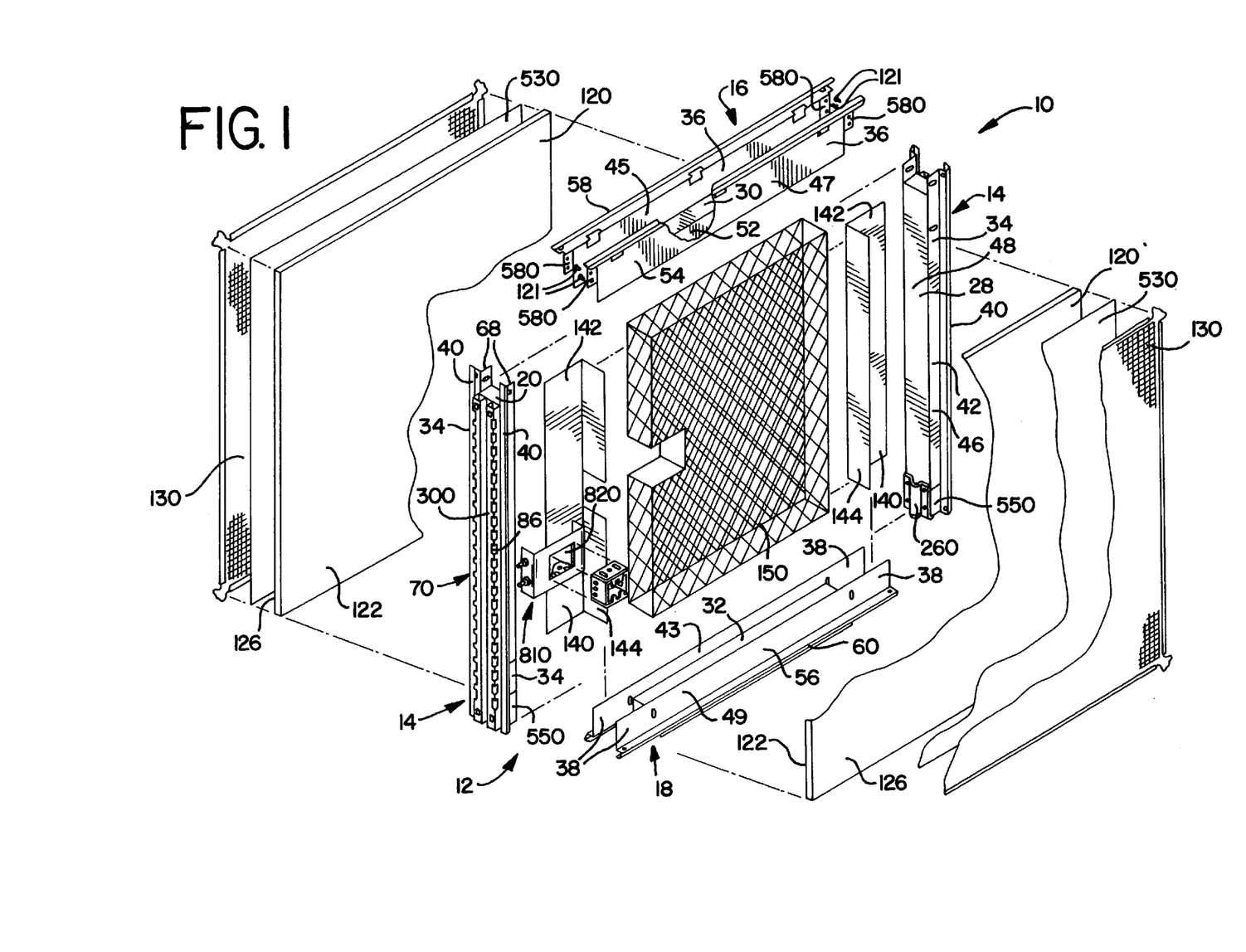
FIG. 1 an exploded perspective view of a wall panel and mounting bracket assembly.

Referring to the drawings, FIG. 1 shows an improved wall panel 10 including a rectangular frame 12, a pair of sheetlike wall members 120 and a pair of thin decorative sheets 130. The frame 12 includes two spaced apart, and generally parallel vertical side frame members 14 and spaced apart and generally parallel horizontal lower and upper frame members 18, 16.

Each frame member 14, 16, 18 includes an elongated core member 28, 30, 32 and a pair of elongated sidewall members 34, 36, 38. Preferably, the core member is made of wood. As used herein, the terms "wood" and "wooden" are intended to have relatively broad meanings, including but not limited to, solid wood and wood products, such as particle board, fiber board and laminated strand lumber. Most preferably, the side core members 28 are made of laminated strand lumber, such as the 38# density material available from TrusJoist/MacMillan Ltd. Partnership in Deerwood, Minn. The horizontal core members 30, 32 preferably are made of 45# density particle board. Alternatively, other materials, such as foamed polymers or composites, may be used.

Preferably, the sidewall members are made from 12 gauge steel sheet metal and are roll formed. However, it should be understood that other materials, such as plastic could also be used. Each sidewall includes an edge portion 40, 58, 60 and a substantially flat leg portion having an inner 44, 45, 43 and outer surface 46, 47, 49; the inner surface 44, 45, 43 engages the side surface of the core member. Preferably, the inner surface 44, 45, 43 is mechanically fastened to the side 52, 53, 57 of the core member, for example, by using staples.

Alternatively, adhesive, nails, rivets or screws can be used to secure the sidewall member to the core member.

Figure 2:
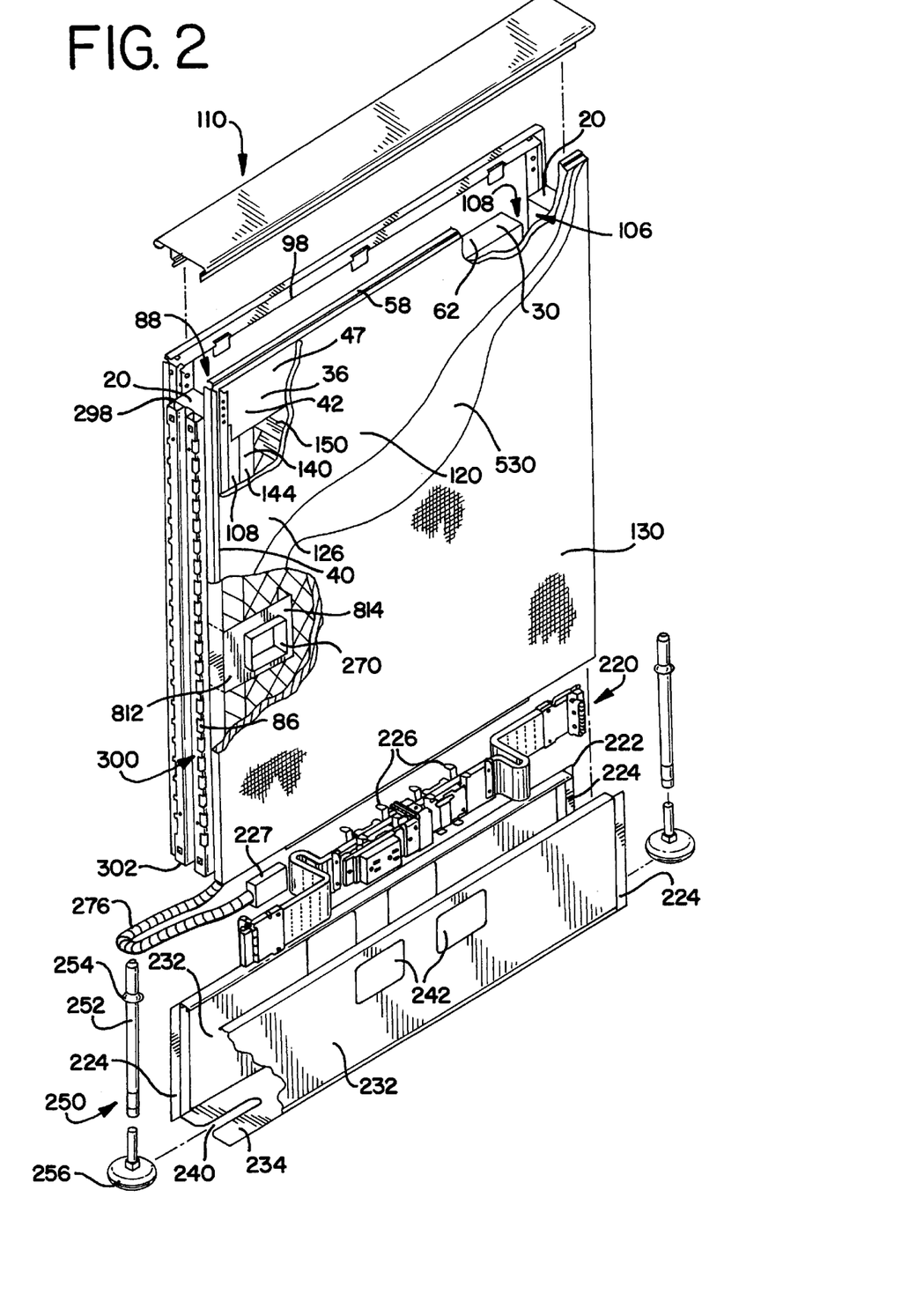
FIG. 2 is a perspective view of the wall panel with a top cap, base cover and power distribution server.

As shown in FIGS. 1 and 2, an elongated hanger bracket 70 is mounted to the outer surface 50 of each vertical core member. The hanger bracket 70 includes two spaced apart, inwardly facing channels 72 connected by a bridge portion 74 that is fastened to the core 28, preferably with a plurality of fasteners 540. Fasteners 542 also secure each end of each channel 72 to the core member 28. Each channel 72 has an inner leg 76, an outer leg 78 and an outer surface member 82. The inner legs 76 of the channels and the bridge portion 74 form an outwardly facing channel 300. The outermost corners 84 on each bracket, formed by the intersection of the outer leg and the surface member, have a plurality of slots 86 running the length of the hanger bracket. The outer surface member 82 of the inwardly facing channels 72 defines the outermost surface of each end of the wall panel. The slots 86 in the hanger bracket are adapted to receive and support various components attached to the wall panel. For example, overhead units and worksurface bracket supports, not shown in the Figures, typically engage the wall panel at the slots.

As shown in FIG. 2, the inner surface 43 of the upwardly extending sidewalls 36 on the upper frame member and the outer surface 62 of the upper core member 30 form a horizontal channel 88 which runs the width of the panel. At each end of the wall panel, the upper end 20 of the vertical side core member 28 lies substantially flush with, or slightly higher than, the outer surface 62 of the upper core member 30 so that wires, cables and the like can be passed easily from one panel to the next. In this way, the upper end 20 of the vertical core member 28 helps to define a portion of the bottom of the horizontal channel 88. A top cap 110 is attached to the upper frame member 18, and covers and encloses the channel 88.

Figure 3:
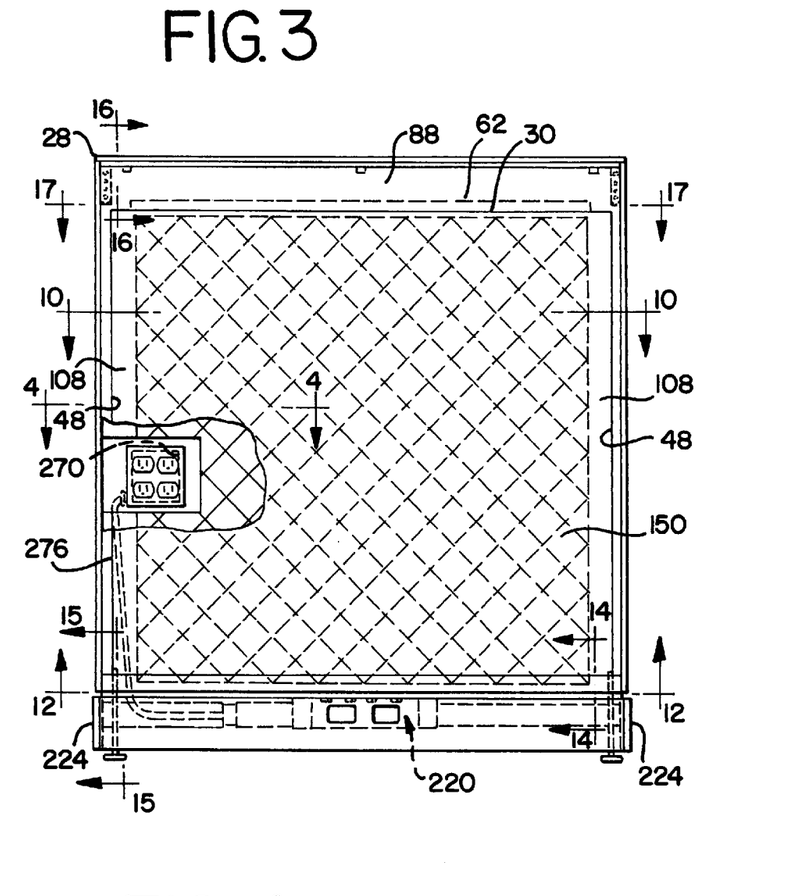
FIG. 3 is a front view of a wall panel with the mounting bracket assembly installed therein.
Figure 4:
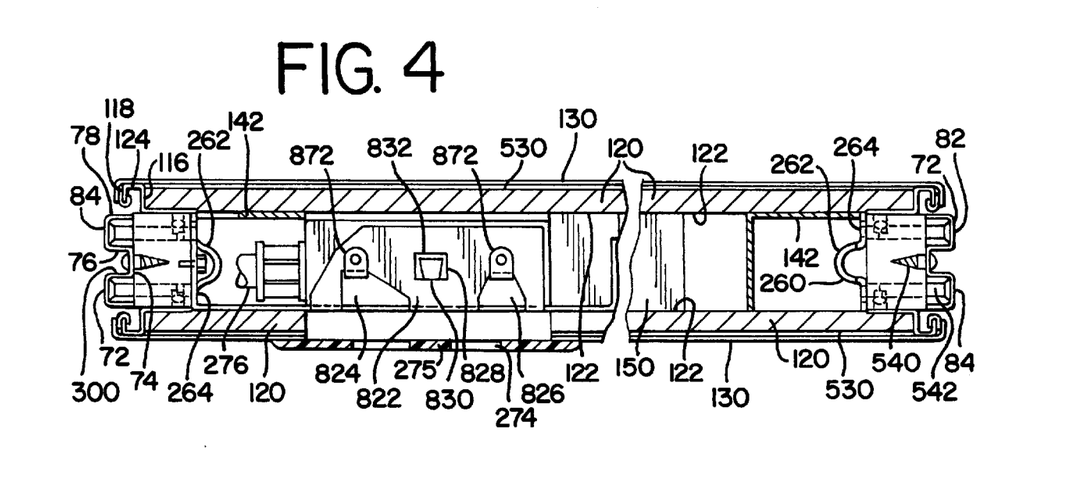
FIG. 4 is sectional view of the wall panel taken along line 4—4 of FIG. 8.

In a preferred embodiment, the ends of the upper core member are spaced apart from the ends of the vertical core member to form an opening 106 between the members near each end of the panel as shown in FIG. 2. These openings 106 provide access to a vertical channel 108, or tube, that extends between the upper horizontal channel 88 and the bottom of the wall panel, as shown in FIG. 2–4. Each vertical channel 108 is formed and defined by the inner surface 48 of the vertical core member, a partition member 140 that extends between the upper and lower horizontal frame members 16, 18 and the inner surface 122 of the wall member 120.

The ends of the lower horizontal core member are spaced apart from the lower end of the vertical core members so as to provide access to the vertical channel 108 from the bottom of the panel as shown in FIG. 3. The lower core member 32 also includes a groove 33 running the length of the core member along the middle of the outer surface 66.

As shown in FIGS. 1 and 4, the edge portions 40, 58, 60 of each sidewall member are preferably configured as a C-shaped channel that runs the length of each side wall member. When the frame members are connected, the edge portions 40, 58, 60 run substantially around the entire periphery on each side of the panel. Each channel includes an inner leg 116 that extends laterally outward in a perpendicular relationship from the leg portion and an outer leg 118 that defines the outer peripheral edge of the wall panel. A intermediate surface member 124 connects the inner 116 and outer leg 118. The surface member 124 is in substantially the same plane as the outer surface 126 of the wall member as shown in FIG. 4. The inner leg 116 of the edge portion and the outer surface 46, 47, 49 of the sidewall leg portions 42, 54, 56 define a shallow, outwardly facing recess on each side of the frame. The recess is shaped to receive the sheetlike wall member 120. Preferably, the wall member 120 substantially fills the recess and is bounded around its periphery by the inner legs 116 of the side walls.

Figure 20:
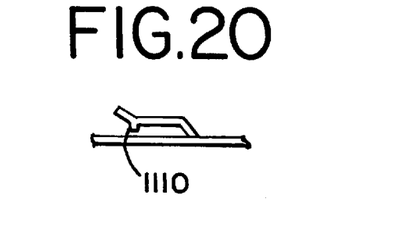
FIG. 20 is a partial view of a tab member having a raised portion.

As shown in FIG. 20, each wall member is attached to one side of the frame with staples. The wall members stabilize and strengthen the wall panel. Preferably, the wall member 120 is made of ½ inch thick fiberboard, such as the industrial insulation board available from Masonite in Lisbon Falls, Me., which is sanded, ironed and sealed. Preferably, the wall member 120 is tackable, so that a user can attach various items to the wall member with tacks, or the like. Other materials, such as particle board or mineral board are also acceptable. Preferably, the wall member 120 is both adhesively secured to the outer surface 46, 47, 49 of the sidewalls and is mechanically fastened to the core members 34, 36, 38 through the sidewall members, preferably by stapling.

As shown in FIGS. 1, 3 and 4, a filler member 150 is installed inside the rectangular frame 12. The filler member 150 is disposed between the wall members 120 and each side of the frame, and extends between the upper and lower horizontal frame members 16, 18. In a preferred embodiment, the filler member 150 is a honeycomb structure made from corrugated cardboard. The honeycomb is adhesively secured to the inner surface 122 of each wall member. The honeycomb increases the strength of the panel and provides sound dampening for the panel. Preferably, the honeycomb filler member is bounded along each vertical end by the partition members 140 installed to form the vertical channels 108 as shown in FIG. 1. In this way, the vertical channels are separated from the honeycomb filler member.

The partition member 140 includes a mounting flange 142 and a boundary flange 144 as shown in FIG. 1. Referring to FIGS. 1 and 4, the mounting flange 142 is adhesively bonded to the inner surface 122 of one of the wall members 120. The boundary flange 144 extends between the two wall members 120 and can be attached to the side of the honeycomb filler member.

Referring to FIGS. 1 and 2, a thin barrier sheet 530, or scrim, is disposed between the decorative sheet 130 and the wall member 120. The barrier sheet 530 preferably includes a layer of aluminum foil laminated to a thin layer of fiberglass. The barrier sheet 530 is preferably about 0.005 inches thick and is used as a fire blocking material. A commercially available barrier sheet is the MANNIGLAS 1207® wet-lay glass fiber mat produced by Lydall Corporation. The barrier sheet can be attached to the wall member with adhesive or mechanical fasteners. Alternatively, the barrier sheet can wrap around the outer leg of the edge portion beneath the decorative sheet, which is attached to the leg with a strip member as described below.

Referring to FIGS. 1 and 2, each thin decorative sheet 130 is disposed over one of the outer surfaces 126 of the wall members. The decorative sheet is preferably a cloth fabric, although it should be understood that other flexible materials would be suitable for covering the wall panel.

Figure 24:
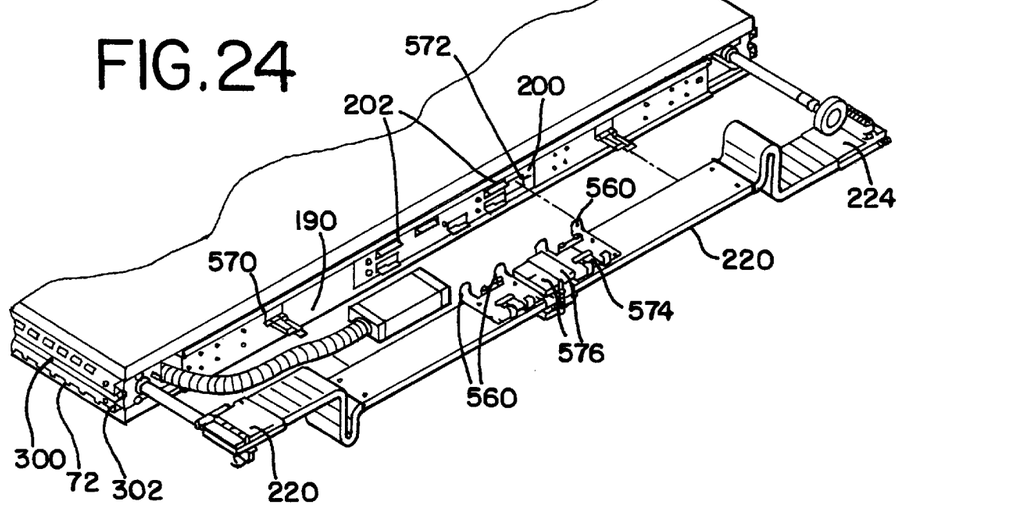
FIG. 24 is a bottom perspective view of the panel and power distribution server.
Figure 25:
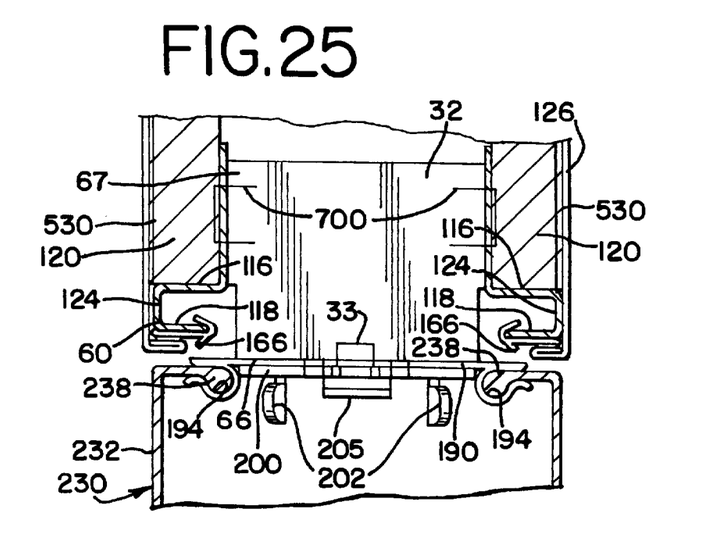
FIG. 25 is a partial section view of the bottom of the panel.

The lower horizontal frame member, shown in FIGS. 24–25, includes a mounting strip 190 and a bracket 200 mounted to the outer surface 66 of the lower core member. As shown in FIG. 25, the outer surface 66 preferably extends below the end portions of the sidewalls. The side surface 67 of the portion of the lower core member extending below the leg portion of the sidewall member is stepped inward to permit the hook member on the strip to be installed on the outer leg. The groove 33 runs along the outer surface of the core member.

The bracket 200 includes several tab members 202 which are adapted to engage and support a power distribution server 220, including an electrical power harnesses 222, as shown in FIGS. 2 and 24. The tab members 202 form slots 203 that receive bracket hooks 560 extending upwardly from the power distribution server as shown in FIG. 24. In operation, the harness 222 is installed by sliding the bracket hooks 560 into the slots 203 until the end of the bracket 560 passes a resilient locking tab 578 which springs downwardly to releasably secure the harness 222 on the bracket 200. When the wall panel is particularly long, the bracket may also include stabilizer brackets 570 that extend downwardly from the bracket and include two arms that engage the harness.

Figure 26:
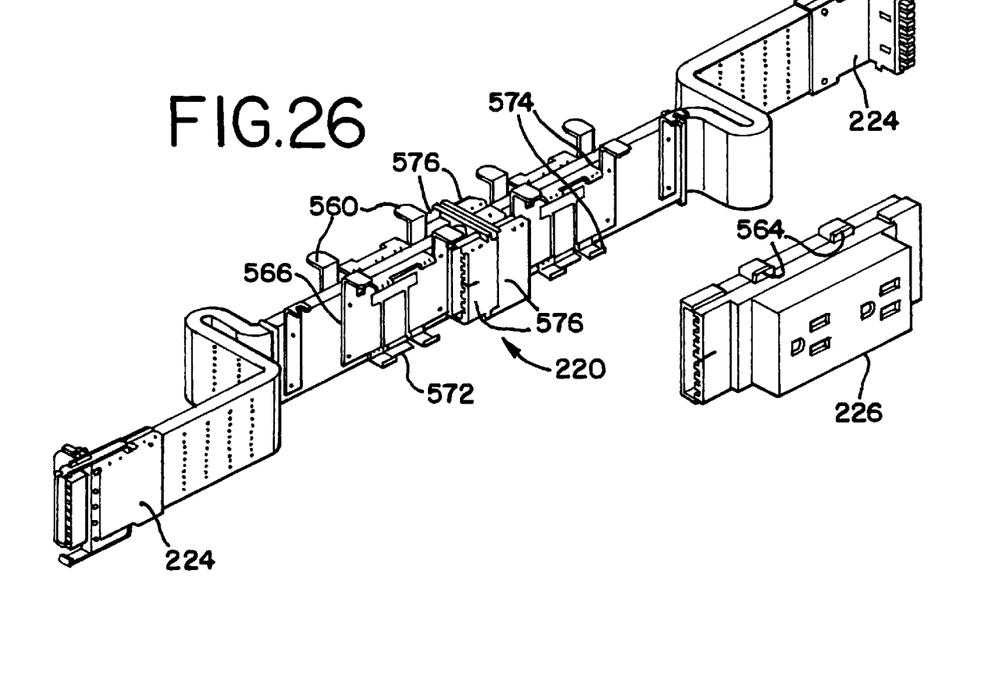
FIG. 26 is a perspective view of the power distribution server.

Referring to FIGS. 24–26, the harness includes a receptacle bracket 566, a spring tab 572 and a plurality of module bracket hooks 574. A plurality of receptacle modules 226 are secured to the harness by engaging the bracket hooks 574 with mounting lugs 564 disposed on the module. Each module 226 is electrically connected to the harness 222 at one of a four receptacle ports 576. Similarly, conduit 276 which extends from an outlet box installed in the panel, as described below, preferably includes a connector that can electrically engage one of the receptacle ports in place of a receptacle module. For a complete description of the power distribution server, including the power harnesses, one is directed to U.S. Pat. No. 5,013,252, issued to Neinhuis et al. on May 7, 1991, the disclosure of which is hereby incorporated by reference. The harness also includes electrical connector ports 224 positioned at the end of the harness and which provide a means for electrically connecting adjacent panels, such that a first panel receives power from a second panel. A commercially available harness, Model No. 225409, is sold by PENT Assemblies of Kendallville, Ind.

Referring to FIG. 24 and 25, the mounting strip 190 is disposed between the bracket 200 and the core member 32. The mounting strip 190 has a pair of elongated grooves 194 running longitudinally along the edges of the mounting strip 190. The mounting strip supports a base cover 230. The base cover 230 includes a pair of side walls 232 and a bottom wall 234, as shown in FIGS. 2 and 25. The side walls 232 and bottom wall 234 are hinged along the longitudinal length of the base cover, preferably by using a flexible hinge material 236. The cover members can also be mechanically hinged. The upper portion of each wall includes a beaded flange 238 that is disposed in the groove 194 in the mounting strip. When mounted on the mounting strip, the base cover 230 forms and defines a horizontal channel for storing and protecting cables and wires beneath the panel. The lower horizontal channel also provides a concealed passage way for the cables and wires as they pass from one panel to the next.

Referring to FIG. 2, the bottom wall 234 of the base cover includes a slot 240 at each end which is adapted to receive a support leg 250 extending down from the vertical frame members 14, as explained below. The side walls 232 extend between the lower edge of the wall panel and the floor and include openings 242 adapted to allow a user to access outlets in the modules 226 secured to the power distribution server, which is mounted to the bottom of the lower frame member. Each end of the side wall 232 on the base cover includes a flexible strip 244 that extends outwardly from the end of the panel. When two panels are installed end-to-end, the opposing flexible strips 244 overlap and conceal the gap between the panels.

Referring to FIGS. 2, the wall panel is supported on and spaced apart from the floor by a support leg 250 attached to each vertical frame member 14. A support bracket 260 is mounted to the bottom of each core member 28 on the inner surface 48 of the core member. The bracket 260 is mounted in the space 106 provided between the end of the lower core member and the bottom end of the vertical core member, as shown in FIG. 3. The bracket 260 includes a U-shaped sleeve portion 262 and a pair of flanges 264. The flanges 264 are fastened to the inner surface of the core member 28 such that the sleeve portion 262 forms an opening 266 with the surface of the core member.

The support leg 250 includes a shaft 252 having a shoulder 254 and a foot 256. An upper portion of the shaft is received in the opening 266 formed by the support bracket and core member until the shoulder 254 of the shaft engages the bottom of the 260 bracket. The bottom of the shaft 252 is threaded and threadably engages the foot member 256 whereby the height of the wall panel can be adjusted by rotating the foot 256 relative to the shaft 252.

In a preferred embodiment, an outlet box 270 is installed inside the wall panel frame between the upper and lower frame members 16, 18. The term "outlet box," as used herein and in the appended claims, generally refers to electrical boxes, switch boxes, data and communication line boxes and other similar types of junction boxes and is not intended to be limited to electrical outlet boxes.

Figure 27:
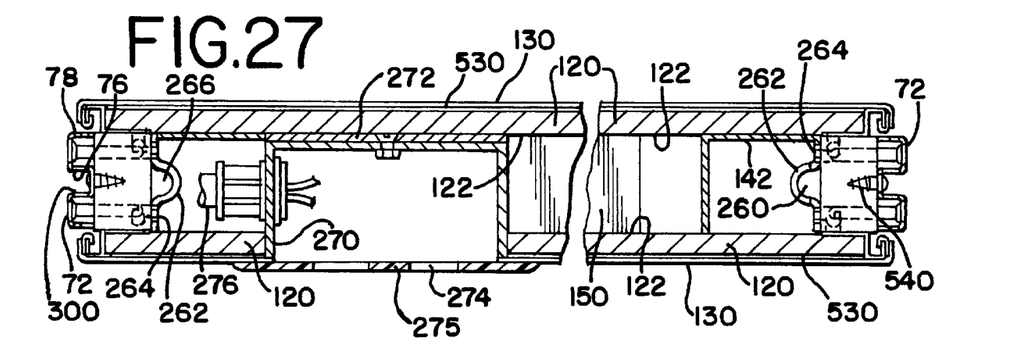
FIG. 27 is a sectional view of the wall panel with an alternative embodiment of the outlet box installed therein.

In one embodiment, shown in FIG. 27, the outlet box 270 is first bolted to a plate member 272, preferably a piece of hardboard. The plate member 272 is adhesively bonded to an inner surface 122 of one of the wall members. The opposite wall member has an opening 274 aligned with the outlet box 270 so as to allow the user access to the box. One of a portion of the partition member or filler material is removed to allow the outlet box to be installed on the inside of the frame. The outlet box can be installed between the partition members, or such that one side of the box is aligned with the partition member to thereby provide a wall defining the inner surface of the vertical channel. The conduit 276 connecting the outlet box to the power system is disposed in the vertical channel and extends through the space between the bottom core member and the vertical core member. The outlet box also can be field installed by cutting a hole in one of the thin sheets, the barrier sheet and the wall member.

Adhesive is applied to the inner edges of the inner surface 122 of the second wall member. The wall member 120 is positioned in the recess formed on a second side of the frame by the edge portions of the sidewalls. When an outlet box has been installed on the first wall member, a hole is cut in the second wall member so as to be substantially aligned with the outlet box once the second wall member is installed.

In an alternative embodiment, the outlet box 270 is installed by attaching it to a mounting bracket 810 installed inside the wall panel. As shown in FIGS. 1–3 and 5–7, the mounting bracket 810 includes a front plate member 812 having an inner and outer surface 814, 816 and a pair of mounting flanges 818 extending laterally from opposite sides of the plate member. The mounting bracket also has an opening 820 or cutout sized to receive the outlet box. A pair of support flanges 822 extend laterally inward from an edge of the cutout. In one embodiment, shown in FIGS. 5 and 6, each support flange 822 includes a pair of insert openings 824, 826 formed as cutouts in the support flange member and a rectangular cutout 828 positioned between the insert openings. Cutout 828 forms a front and rear edge 830, 832 in the support flange.

Figures 5, 7:
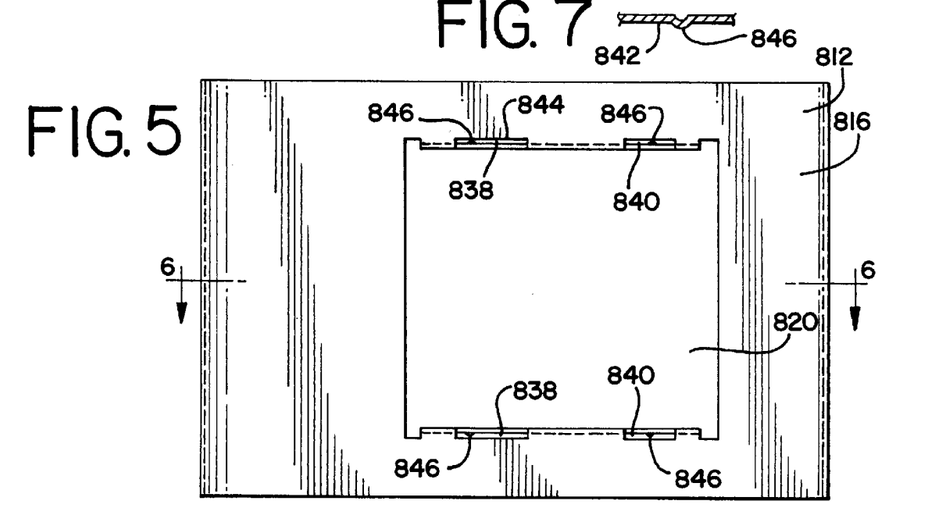
FIG. 5 is a front view of one embodiment of the mounting bracket.
FIG. 7 is an enlarged view taken along line 7—7 of FIG. 6.
Figure 6:
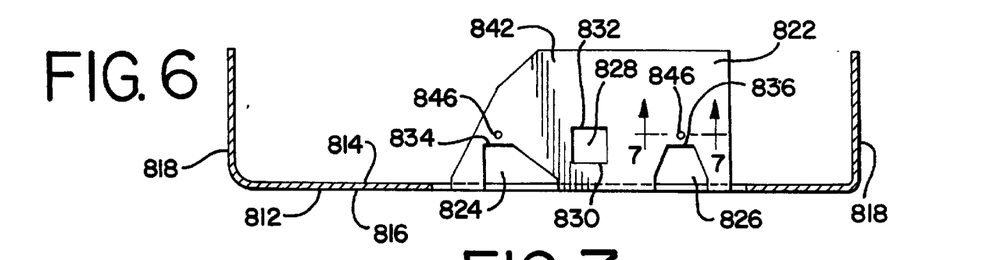
FIG. 6 is a cross-sectional view of the mounting bracket taken along line 6—6 of FIG. 5.

Each of the insert openings 824, 826 preferably extends inwardly from the interface of the support flange and plate member and terminates in a rear edge 834, 836. Preferably, mouths 838, 840 are formed at the intersection of the front plate 812 and support flange so as to provide a space between the edge 844 of the opening in the plate member and an outer surface 842 of the support flange for insertion of the tab members. As shown in FIGS. 6 and 7, a raised portion, configured as a protuberance 846, or nipple, is formed on an outer surface 842 of the flange adjacent to the rear edge of the insert opening.

Figures 10, 11, 13:
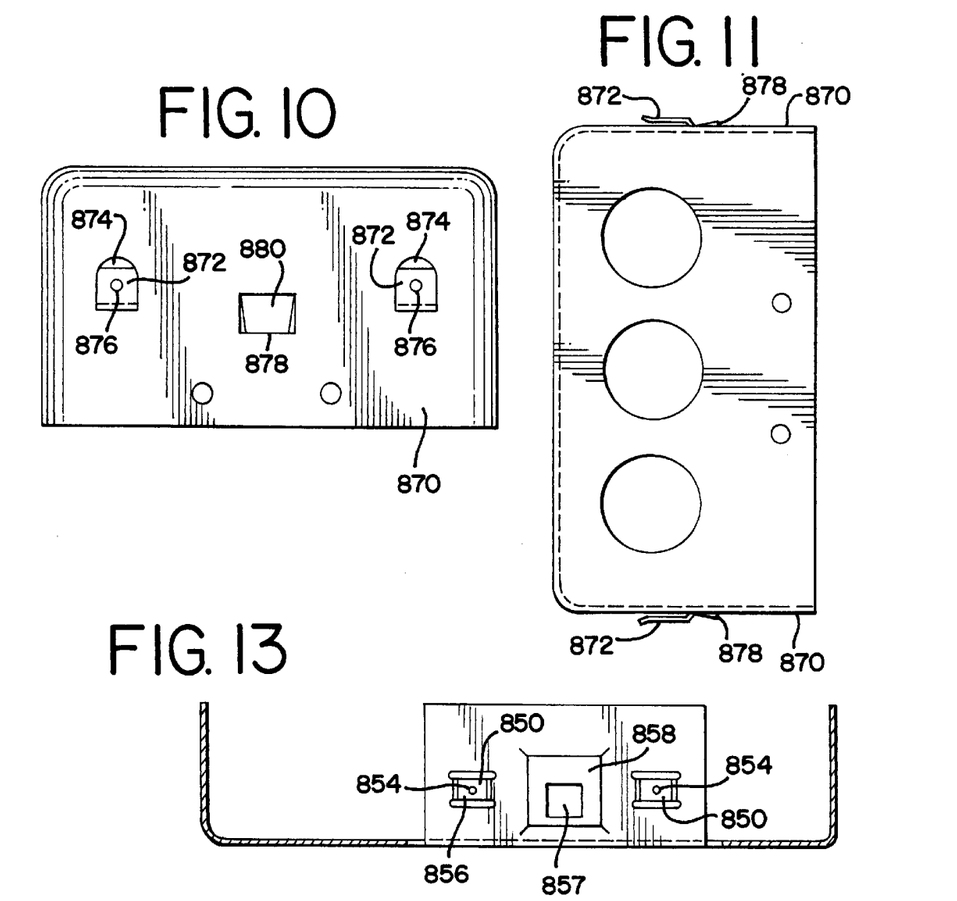
FIG. 10 is top view of an alternative embodiment of the outlet box.
FIG. 11 is a side view of the outlet box of FIG. 10.
FIG. 13 is a cross-sectional view of the mounting bracket of FIG. 12 taken along line 13—13 of FIG. 12.
Figure 12:
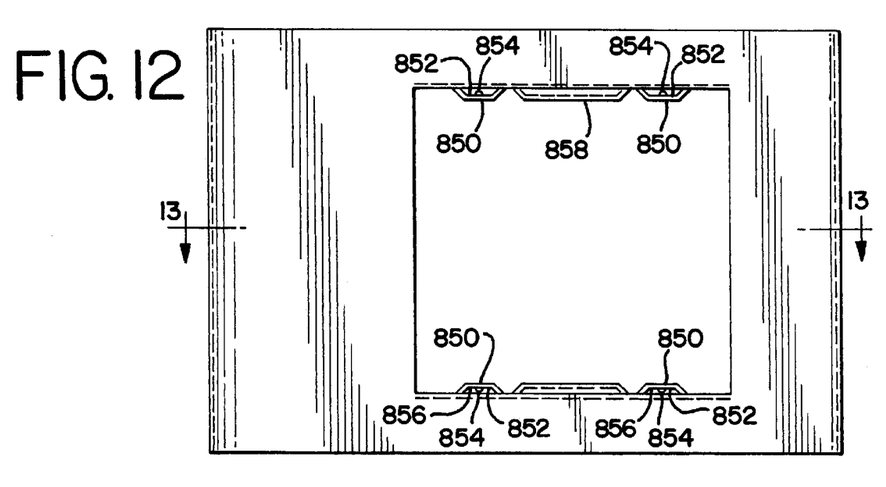
FIG. 12 is front view of an alternative embodiment of the mounting bracket.

In alternative embodiment, shown in FIGS. 12 and 13, each support flange includes a pair of hanger members 850 depending inwardly from each support flange, with a landing 858 having cutout 857 positioned between the hanger members 850. The landing 858 is formed in substantially the same plane as the hanger members 850. Each of the hanger members 850 form an insert opening 852. A nipple 854 is disposed on the outer surface of each hanger member and is shaped to be received in an opening 876 formed in the tab member. Alternatively, as shown in FIG. 20, the nipple 1110 is disposed on the tab member and is received in an opening postioned in the support member, or mounting member, including for example, a hanger member, depending upon which member the tab member extends from.

Figures 8, 9:
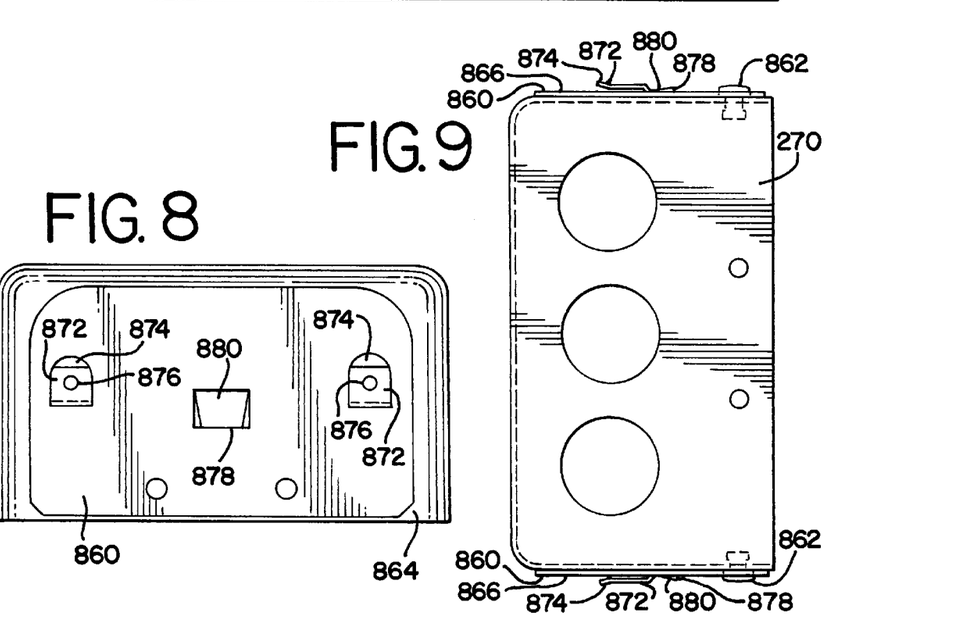
FIG. 8 is a top view of an outlet box with one embodiment of a mounting member applied thereto.
FIG. 9 is a side view of the outlet box and mounting member of FIG. 8.

As shown in FIG. 8 and 9, a pair of mounting members 860 are attached to opposite sides 864 of the outlet box with a pair of rivets 862, or other suitable fasteners, welding or the like. Alternatively, as shown in FIGS. 10–11, the mounting members can be formed integrally as opposite walls 870 of the outlet box itself. Each mounting member 860, preferably formed as a plate member, includes a pair of resilient tab members 872. The tab members 872 are spaced apart from each other at a distance approximately equal to the distance between the insert openings in the support flange, or a distance equal to the distance between the hanger members, so that the various aspects are aligned during the installation of the outlet box. The tab members 872 extend from the mounting member and are spaced apart from an outer surface 866 of the mounting member and include upturned end portions 874. The upturned end portion is provided to initially guide the tab member over the edge of the support member, and also over the raised portion, or protuberance, so as to ease the installation process. Each tab member 872 also includes an opening 876 positioned therein. The mounting member 872 also includes a raised portion configured as a lip portion 878 extending from the outer surface 866 and a ramped surface 880 extending between the lip portion 878 and the outer surface 866 of the mounting member.

Figure 14:
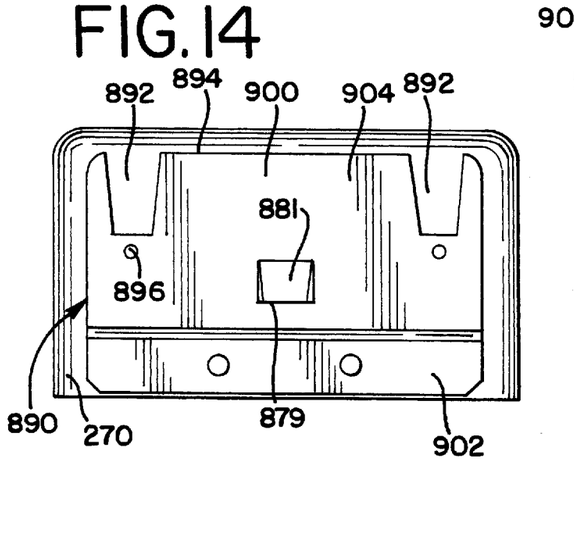
FIG. 14 is a top view of an alternative embodiment of the mounting member.
Figure 15:
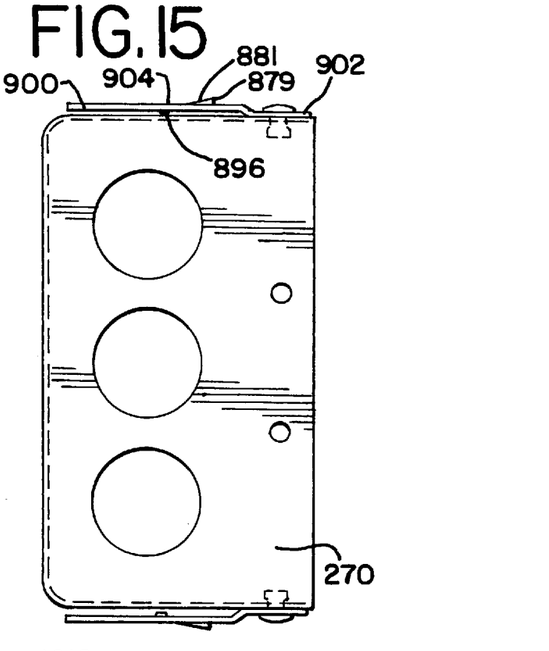
FIG. 15 is a side view of the outlet box and mounting member of FIG. 14.
Figure 16:
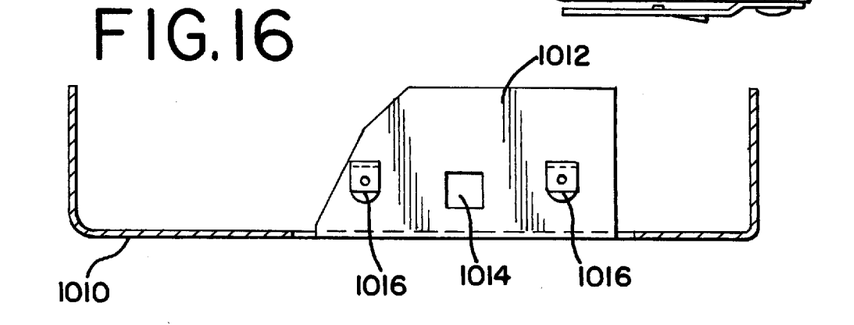
FIG. 16 is a sectional view of an alternative embodiment of the mounting bracket.
Figure 17:
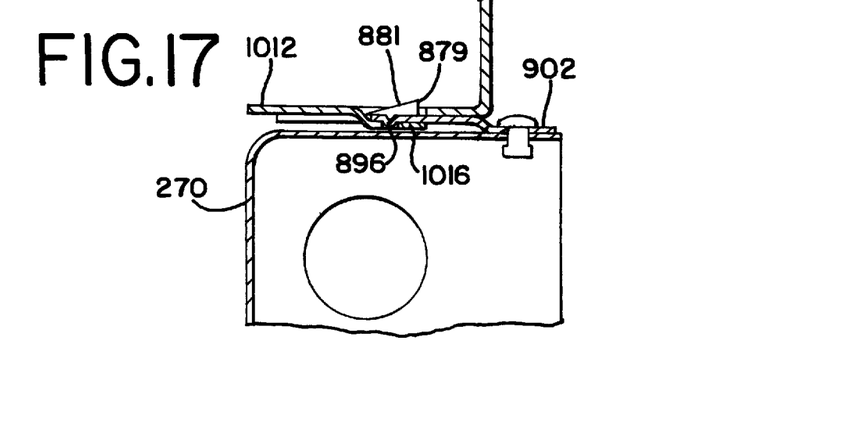
FIG. 17 is a cross-sectional side view of the mounting member of FIG. 14 applied to an outlet box and the mounting bracket of FIG. 16.

In an alternative embodiment, shown in FIGS. 14 and 15, a mounting member 890 includes plate member 900 having a pair of notched openings 892 extending inwardly from an edge 894 of the mounting member. A nipple 896 is formed on an inner surface 898 of the plate member adjacent the end of the notched opening. A lip portion 879 and ramped surface 881 extend from an outer surface 904 of the plate member 900 opposite the nipples. The mounting bracket also includes a mounting flange 902 connected to and offset from the plate member in a spaced apart and parallel relationship. The mounting, flange 902 is fastened to the outlet box with fasteners, or by welding or the like. As shown in FIG. 17, the mounting member 890 engages the mounting bracket 1010 shown in FIG. 16. In this embodiment, the support member 1012 includes a cutout 1014, and two tab members 1016. Each tab member 1016 has an opening shaped to receive the protuberance 896 and an upturned end portion.

Figure 22:
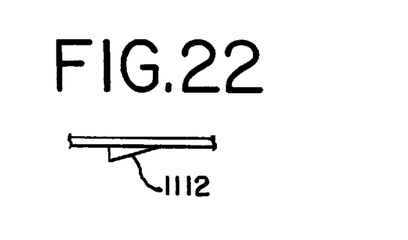
FIG. 22 partial view of the support member having a raised portion.
Figure 23:
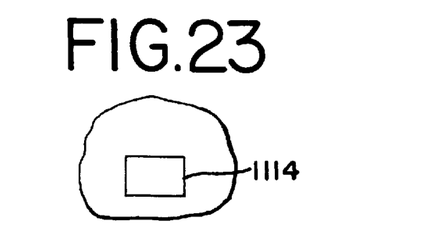
FIG. 23 is a partial view of a cutout positioned in the mounting member.

It should be understood, as shown in FIGS. 22–23, that the raised portion, configured as lip portion 1112 and ramped surface, and cutout 1114 can be reversed, wherein the lip portion 1112 and ramped surface are formed on the support member and engage the cutout 1114 formed in the mounting member. Similarly, the raised portion formed as a nipple can be formed on either member and engage an opening in the other member.

Figure 18:
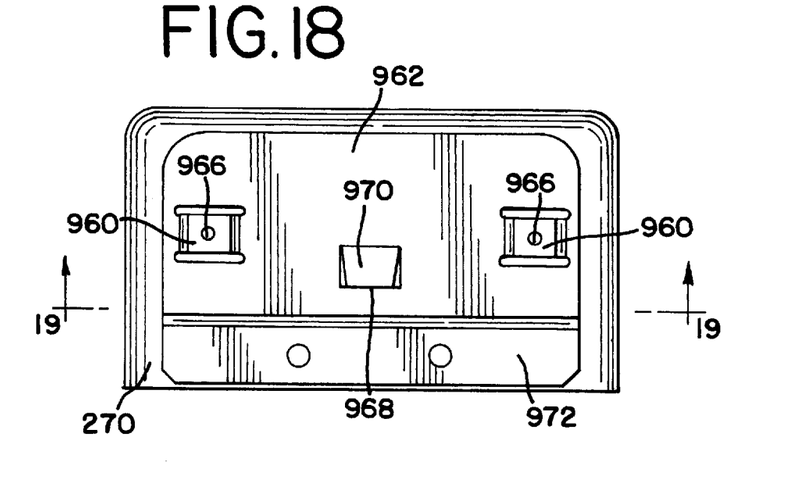
FIG. 18 is a top view of an alternative embodiment of the mounting plate.
Figure 19:
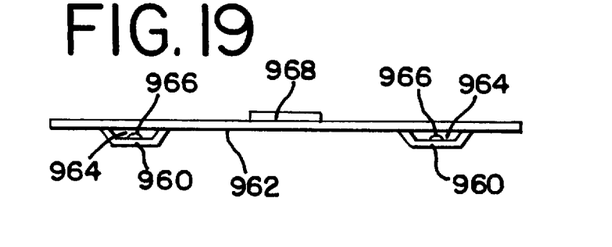
FIG. 19 is a cross-sectional view of the mounting plate of FIG. 18 taken along line 19—19 of FIG. 18.

In yet another alternative embodiment of the mounting member shown in FIGS. 18 and 19, the mounting member includes a pair of hanger members 960 depending from an inner surface of a plate member 962. In one embodiment, each hanger member 960 forms an insert opening 964, and includes a raised portion, configured as a nipple 966. The plate member also includes a raised portion configured as a lip portion 968 and a ramped surface 970. A mounting flange 972 is connected to and spaced apart in parallel relationship to the plate member 962. The mounting flange is adapted to be mounted to the outlet box 270. The lip portion 968 engages an edge formed by the cutout 1014 of the mounting bracket shown in FIG. 16. Similarly, tab members 1016 engage the hanger members 960.

Figure 21:
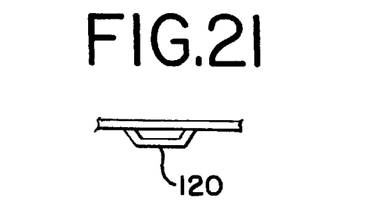
FIG. 21 is a partial view of an alternative embodiment of a hanger member.

It should be understood by those of skill in the art, and as shown in the attached Figures, that the tab members and insert openings, or notches, and the lip portion and cutout, can be interchanged between the mounting member and mounting bracket respectively. Moreover, it should be understood that the outlet box can be secured to the mounting bracket through the engagement of only the lip portion with the edge of the cutout, or by engagement of the nipple with the tab members, i.e., either aspect of the invention can function to secure the mounting member to the mounting member independent of the other aspect. For example, the hanger member 1120 shown in FIG. 21 does not include a raised portion or an opening to receive such a member.

Preferably, the above-described embodiments of the mounting bracket and mounting member are each made from a formed piece of electro-galvanized sheet metal having a thickness of 0.028 to 0.031 inches.

The mounting bracket is installed in the panel, or wall, by attaching the mounting flange 818 to the vertical frame member, and more specifically, by attaching the flange 818 to the core member 28 with a plurality of fasteners. The mounting bracket is positioned within the panel such that the front surface 816 of the plate member abuts the inner surface 122 of the wall member. As shown in FIGS. 1, 3 and 4, portions of the boundary flange and the filler member are cut away at the desired location for the outlet box 270 such that the mounting bracket can be inserted into the panel.

To install an outlet box 270 having a mounting member, whether it is separately attached to the box or integrally formed therewith, a hole is cut in the wall member so as to be aligned with the opening 820 in the front plate 812 of the mounting bracket. Preferably, when installing an electrical outlet box, as contrasted with a data box, an electrical conduit 276 is connected to a side wall at a knockout opening. Suitable electrical conduits are commercially available from and sold by Anamet Electrical (Part No. 452115) and International Metal Hose (Part No. AFS-½ inch). The conduit terminates at a connector 277 that is adapted to electrically engage one of the receptacle ports 576 in the harness mounted in the base of the panel. The conduit 276 and connector 277 are threaded through the opening in the wall member and are thereafter passed through the vertical channel 108 to the bottom of the panel where the connector is connected to the harness.

The outlet box 270 is then inserted through the opening in the wall member and through the opening in the plate member of the mounting bracket. However, when the outlet box has a conduit 276 extending from one of its sides, which can be somewhat inflexible at the point of connection, the outlet box cannot be inserted perpendicular to the surface of the wall member. Rather, the side of the outlet box connected to the conduit must be urged into the opening first, as it is connected to the conduit which extends through the vertical channel. The outlet box is then pivoted into a snap-fit engagement with the mounting bracket.

For example, as shown in FIGS. 4–9, the tab members 872 are inserted over the rear edge 834 of the insert opening until the nipples 846 are received within the opening 876 in the tab member 872. Initially, the tab member 872, which is resilient, is biased outwardly as it rides over the nipple until it eventually snaps into place. Simultaneously, the ramped surface 880 of the mounting member rides along the inner surface 841 of the support flange and biases the support flange away from the mounting member until the lip portion 878 snaps into engagement against the edge 832 of the cutout 828. As the lip portion 878 snaps into engagement, the ramped surface 880 of the raised portion is received within the cutout 828 so that support member is no longer biased away from the mounting member and comes into contact with the mounting member. In this way, the outlet box is securely mounted to the mounting bracket without the use of mechanical fasteners, and without having to access the inside of the panel.

In a preferred embodiment, an outlet box having an electrical outlet and conduit is mounted on the right-hand side of the panel, as opposed to the left-hand side as shown in FIGS. 2 and 3. That is because the connector 277 extending from a right-hand box is oriented to engage the right-hand receptacle port 576 on the same side of the harness and the panel as the outlets installed in the outlet box. More particularly, because the connector 277 occupies one of the spaces otherwise available for a receptacle module 226, and corresponding outlet, it is desirable to provide the user with access to outlets installed in the outlet box on the same side where the receptacle module is occupied, and the corresponding outlet is eliminated, along the base of the panel.

It should be understood by those of skill in the art that the various mounting members and support members shown in the other embodiments of FIGS. 10–22 are secured to each other in a similar fashion, with either or both of the raised portions, i.e., the protuberance and/or lip portion and ramped surface, biasing the support member and mounting member away from each other, including, for example, a biasing of the tab member by the protuberance until the raised portion is received within an opening, wherein the support member and mounting member are brought into a locking, snap-fit engagement with each other.

To facilitate this installation process of the outlet box shown in FIGS. 8–10, the insert openings 824, 826 have non-parallel side edges, as shown in FIGS. 4 and 6, so as to make the insert opening wider at its mouth and narrower at the rear edge. In this way, one side of the outlet box can be disposed in the opening in the wall panel such that the tab members along that side are aligned within the insert opening. The outlet box is then generally pivoted about that side until the tab members along the other side began to engage the support flange at the opposite insert opening. The angled side edges of the sidewall guide the tab member and provide room for it to pivot with the outlet box into eventual engagement with the rear edge of the support flange cutout.

When mounting the outlet box in the bracket embodiment shown in FIGS. 12 and 13, the hanger members 850 are sufficiently spaced from the front plate 812 so that the outlet box can be generally pivoted into a substantially perpendicular relationship with the wall member and such that the tab members are generally aligned with the hanger member insert openings.

In a similar fashion, the mounting bracket 890 shown in FIG. 14 includes insert openings which having non-parallel side edges providing a tapered insert opening so that the outlet box can be pivoted into engagement with the mounting bracket.

It should be understood that the mounting procedure just described can be used when first assembling panels in the manufacturing plant, or when retrofitting panels in the field, provided they include a mounting bracket mounted therein. Alternatively, the outlet box can be secured to the mounting bracket prior to installing the wall member.

It should be understood by those of skill in the art, that the mounting bracket assembly is not limited for use in the moveable wall panels described herein, but is equally usefull for installing outlet boxes in permanent walls made from wood or metal studs covered with wallboard sheets and the like.

After installing the outlet box, outlets, switches and the like can be installed in a well-known and conventional way by electrical connection and mechanical fastening. An outlet cover 275 can then be installed over the opening. The outlet box is electrically connected to the power distribution server with an electrical conduit 276 that is disposed in the vertical channel 108, as described above. It should be understood that the same or similar box can be installed to provide access to data and communication wiring and cables.

Since the improved outlet box can be inserted without the need to access the inside of the box, the electrical conduit and electrical outlets, switches and the like can be pre-installed in the outlet box by an electrician prior to installing the outlet box in the panel or wall. Such prewired outlet boxes can be purchased as an assembly and installed simply by inserting the outlet box into a snap-fit engagement with the mounting bracket so as to eliminate the need for an electrician to wire the conduit, outlet, switch or the like in the manufacturing facility or in the field. The conduit connector is then simply connected to one of the harness receptacle ports.

When assembled in a system of panels, the horizontal channel formed along the top and bottom of the panels provides the user with an ideal and easy to access space for storing and routing cables and wires, such as communication and data lines. Moreover, the vertical channels in each panel allow the user to easily rout wires and cables from the top of the panel to the bottom. In addition, the vertical channels provide a ready-made space for routing electrical conduit from the outlet mounted in the panel to the base of the panel and the attached power distribution system.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. A mounting assembly comprising:
    an outlet box
    a mounting bracket comprising a flat plate member having an opening adapted to receive the outlet box and at least one support member extending laterally from said plate member at an edge of said opening;
    said outlet box comprising a mounting member;
    a resilient tab member affixed to one of said mounting member and said mounting bracket and engaging the other of said mounting member and said mounting bracket;
    a raised portion disposed on one of said mounting member and said support member, said raised portion slidably engaging the other of said mounting member and said support member during insertion of the outlet box so as to bias said mounting member away from said support member until said raised portion is brought into locking engagement with the other of said mounting member and said support member.

2. The mounting assembly of claim 1 wherein one of said mounting member and said support member further comprises an insert opening, said tab member engaging one of said mounting member and said mounting bracket at an edge of said insert opening.

3. The mounting assembly of claim 2 wherein said insert opening is formed as a cutout in said support member and has a mouth formed at said edge of said opening in said mounting bracket plate member whereby said tab member passes through said mouth and engages said support member at said edge of said insert opening.

4. The mounting assembly of claim 2 wherein said resilient tab member extends from said mounting member and said insert opening is positioned in said support member, and wherein said raised portion is disposed on said mounting member and engages said support member.

5. The mounting assembly of claim 4 wherein said support member further comprises a cutout forming an edge in said support member, wherein said raised portion engages said edge of said cutout.

6. The mounting assembly of claim 4 wherein said mounting member comprises a plate, wherein said tab member is spaced apart from an outer surface of said plate, and wherein said support member is received between the outer surface of said plate and said tab member.

7. The mounting assembly of claim 1 wherein said raised portion comprises a ramped surface and a lip portion, said ramped surface slidably engaging one of said support member and said mounting member during the insertion of the outlet box so as to bias said mounting member away from said support member until said lip portion is brought into locking engagement with one of said mounting member and said mounting bracket and said ramped surface is received within a cutout formed in one of said support member and said mounting member, whereby said mounting member is mounted to said support member with a snap-fit engagement.

8. The mounting assembly of claim 1 wherein said raised portion comprises a protuberance disposed on one of said mounting member and said support member, and wherein the other of said mounting member and said support member has an opening adapted to receive said protuberance, whereby said mounting member is lockably secured to said mounting bracket when said protuberance is received in said opening.

9. The mounting assembly of claim 8 wherein said support member has an insert opening and said protuberance is disposed on a surface of said support member adjacent said insert opening, said resilient tab member affixed to said mounting member and engaging said support member at an edge of said insert opening and wherein said opening shaped to receive said protuberance is positioned in said resilient tab member.

10. The mounting assembly of claim 8 wherein said protuberance is disposed on said resilient tab member.

11. The mounting assembly of claim 1 wherein said mounting member comprises a plate member mounted to a wall of the outlet box.

12. The mounting assembly of claim 1 wherein said mounting member is integrally formed as a wall of said outlet box.

13. The mounting assembly of claim 1 wherein said tab member further comprises an upturned end portion.

14. The mounting assembly of claim 1 wherein said mounting bracket further comprises a second support member and said outlet box further comprises a second mounting member, one of said second support member and said second mounting member comprising a resilient tab member and a raised portion slidably engaging the other of said second support member and said second mounting member during insertion of the outlet box so as to bias said second mounting member away from said second support member until said raised portion is brought into locking engagement with the other of said second mounting member and said second support member.

15. The mounting assembly of claim 1 wherein said mounting bracket further comprises a flange extending laterally from said plate member, said flange adapted to be mounted to a frame member.

16. The mounting assembly of claim 1 wherein one of said support member and said mounting member comprises a hanger member forming said insert opening, said resilient tab member engaging said hanger member.

17. The mounting assembly of claim 16 wherein said tab member is affixed to said mounting member and wherein said hanger member depends from said support member, said support member further comprising a landing lying in substantially the same plane as said hanger member, said support member having a cutout positioned in said landing, wherein said raised portion engages an edge of said cutout.

18. The mounting assembly of claim 1 wherein said tab member is affixed to said support member, and wherein said mounting member further comprises an insert opening, said tab member engaging said mounting member at said insert opening.

19. The mounting assembly of claim 18 wherein said mounting member further comprises a hanger member forming said insert opening.

20. A mounting assembly comprising:

an outlet box a mounting bracket comprising a flat plate member having an opening adapted to receive said outlet box and a pair of support members extending laterally from said plate member at opposite edges of said opening, each of said support members having a cutout forming an edge in said support member;

said outlet box comprising a pair of mounting members, each of said mounting members comprising at least one resilient tab member and a raised portion, each of said at least one resilient tab members engaging one of said support members, and said raised portion slideably engaging an inner surface of said support member during insertion of the outlet box so as to bias said mounting member away from said support member until said raised portion is brought into locking engagement with the edge of said cutout.

21. The mounting assembly of claim 20 wherein said mounting member is attached to a wall of the outlet box.

22. The mounting assembly of claim 20 wherein said mounting member is integrally formed as wall of the outlet box.

23. The mounting assembly of claim 20 wherein said tab member comprises an upturned end portion.

24. The mounting assembly of claim 20 wherein said support member further comprises an insert opening, said tab member engaging said support member at said insert opening.

25. The mounting assembly of claim 24 wherein said support member comprises at least one hanger member forming said insert opening.

26. The mounting assembly of claim 25 wherein said support member further comprises a land portion depending from said support member and lying in substantially the same plane as said hanger member, wherein said cutout is formed in said land portion.

27. A method for installing an outlet box in a wall panel comprising the steps of:

providing a wall panel comprising a mounting bracket mounted internally therein and a wall member, said mounting bracket comprising a plate member having a front surface abutting an inner surface of said wall member and an opening, and a support member extending laterally from said plate member away from said inner surface of said wall member;

providing an outlet box comprising a mounting member, wherein one of said mounting member and said support member comprise a tab member and wherein one of said mounting member and said support member comprise a raised portion;

cutting a hole in said wall member in alignment with said opening in said plate member;

connecting a utility line to said outlet box;

threading said utility line through said opening in said wall member;

inserting said outlet box through said opening in said wall member such that said tab member engages the other of said mounting member and said support member, and said raised portion slideably engages the other of said mounting member and said support member and biases said support member away from said mounting member until said raised portion is brought into locking engagement with the other of said support member and said mounting member so as to provide a snap-fit engagement between the support member and mounting member.

28. The method of claim 27 wherein said utility line comprises an electrical conduit.

29. The method of claim 27 wherein one of said support member and said mounting member further comprise an insert opening, wherein said tab member engages said one of said support member and said mounting member at said insert opening.

30. The method of claim 29 wherein one of said support member and said mounting member further comprises a hanger member forming said insert opening.

\* \* \* \* \*

UNITED STATES PATENT AND TRADEMARK OFFICE
CERTIFICATE OF CORRECTION

PATENT NO. : 5,873,553
DATED : February 23, 1999
INVENTOR(S) : Shawn Stahl et al.

It is certified that error appears in the above-identified patent and that said Letters Patent is hereby corrected as shown below:

On the Title Page

In column 1, line 8, under "U.S. PATENT DOCUMENTS", delete "Jeff" and substitute --Jett-- in its place.

In the Claims

In claim 22, line 2, delete "as wall" and substitute --as a wall-- in its place.

Signed and Sealed this

Twenty-ninth Day of May, 2001

Attest:

NICHOLAS P. GODICI

Attesting Officer    Acting Director of the United States Patent and Trademark Office